United States Patent [19]
Colvin et al.

[11] Patent Number: 5,124,139
[45] Date of Patent: Jun. 23, 1992

[54] METHOD FOR PREPARING BASIC ALUMINUM CHLOROSULFATE

[75] Inventors: William H. Colvin, The Woodlands, Tex.; Michael P. White, Little Rock, Ark.

[73] Assignee: Rhone-Poulenc Inc., Princeton, N.J.

[21] Appl. No.: 575,455

[22] Filed: Aug. 31, 1990

[51] Int. Cl.⁵ .......................... C01B 17/45; C01B 7/56
[52] U.S. Cl. ...................... 423/467; 423/556
[58] Field of Search ..................... 423/467, 556

[56] References Cited

U.S. PATENT DOCUMENTS

| | | | |
|---|---|---|---|
| 3,894,144 | 7/1975 | Becher et al. | 423/467 |
| 3,929,666 | 12/1975 | Aiba et al. | 423/556 |
| 4,654,201 | 3/1987 | Carlsson | 423/556 |
| 4,981,673 | 1/1991 | Boutin et al. | 423/467 |

FOREIGN PATENT DOCUMENTS

| | | | |
|---|---|---|---|
| 218487 | 4/1987 | European Pat. Off. | 423/556 |
| 377393 | 5/1989 | European Pat. Off. | 423/556 |
| 2547695 | 4/1976 | Fed. Rep. of Germany | 423/556 |
| 3338624 | 4/1984 | Fed. Rep. of Germany | 423/467 |
| 2128977 | 5/1984 | United Kingdom | 423/467 |

*Primary Examiner*—John Niebling
*Assistant Examiner*—Brian M. Bolam

[57] ABSTRACT

A process for preparing basic aluminum chlorosulfate comprising:
1) forming a reaction mixture in an aqueous medium of aluminum chloride and aluminum sulfate in a molar ratio of aluminum chloride: aluminum sulfate ranging from about 0.75:1 to about 1:3 to 1 followed by
2) basifying the product by reacting the product of step 1) with a source of calcium sufficient and under conditions sufficient to form a polymer.

19 Claims, No Drawings

METHOD FOR PREPARING BASIC ALUMINUM CHLOROSULFATE

FIELD OF THE INVENTION

The present invention relates to basic aluminum chlorosulfate, the process for the preparation thereof and the use thereof as a coagulating agent for the treatment of aqueous medium.

BACKGROUND OF THE PRIOR ART

Various coagulating agents which can be used for treating effluents, residual waters, or waste waters are known. Examples include ferrous chloride, ferric chloride, ferrous sulfate, ferric sulfate, and ferric chlorosulfate. Mention may also be made of basic aluminum chlorosulfates such as described in French Patent Application Nos. 2 036 685 and 2 418 297.

Mention can also be made of the basic aluminum chlorosulfates described in French Patent Publication Numbers 2 584 699, 2 600 321, and 2 600 322, which are described as providing a basic aluminum chlorosulfate which can provide low levels residual aluminum in treated waters, capable of forming muds having high coefficient cohesion and which are both colorless and have a low level of cloudiness.

The basic aluminum chlorosulfate as described in the previously referenced French Patent Publications comprises a substance of the formula:

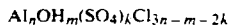   $Al_nOH_m(SO_4)_k Cl_{3n-m-2k}$   1 in which the basicity or the ratio m divided by 3n times 100 is between 40% and 65%, and which has an aluminum equivalent/chloride equivalent ratio of between 2.8 and 5, an Apparent Molecular (AM) mass measured by conventional light diffusion in aqueous solution of 8.3% $Al_2O_3$ by weight within the range of from about 7,000–35,000 and preferably 22,000 and 32,000 daltons, said basic aluminum chlorosulfate being characterized as having apparent hydrodynamic diameters Phi$_Z$ and Phi$_H$ measured by quasi-elastic diffusion of light, of the following values expressed in manometers:

Phi$_Z$(nm) = 35–250 (350–2500 Å) and preferably 80–100 nm

Phi$_H$ (nm) = 20–120 (200–1200 Å) and preferably 150–220 nm

As disclosed in the previously referenced French Patent Publications, the basic aluminum chlorosulfate of formula I is prepared by a process comprising the steps of reacting a slurry of calcium chloride with calcium carbonate to form a chlorocarbonated slurry, bringing the chlorocarbonate slurry into contact with aluminum sulfate, wherein the slurry is incrementally added over a period ranging from about 45 minutes to four hours and separating the resulting solid by-product from the reaction medium. This separation makes it possible to obtain a calcium sulfate filter cake and a filtrate containing the basic aluminum chlorosulfate. The amounts of the chlorocarbonated slurry and the aluminum sulfate which are added are such that, for the basic aluminum chlorosulfate produced, there is a ratio m/3n times 10% of between about 40% and 65% and an aluminum equivalent/chloride equivalent ratio between 2.8 and 5.

The patent states the importance of three parameters: basicity of between about 40% and 65% and more particularly between about 45% and 56%; Al/Cl equivalent ratio of between about 2.8 and 5, preferably 3.2 to 5 and more preferably 3.2 to 4; and the degree of desulfation (said degree representing the ratio of the amount of sulfate removed to that present in the initial aluminum sulfate) of between about 70% and 90%, preferably 70%–85% and more preferably between about 75% and 82%. These three parameters are stated to be important in preparing a product having a high level of stability represented by storage time in the absence of precipitation. The patent teaches that the product disclosed therein has a level of stability of several months at ambient temperature.

Finally, measurements by NMR of the monomer aluminum showed that there is from 15% to 25% of monomer aluminum in the basic aluminum chlorosulfate, the rest of the aluminum being in polymer form.

The products may also be characterized in an equivalent and equally applicable manner by means of their mean molecular mass by weight $M_w$ and their mean real hydrodynamic diameters Phi$_{Zt}$ and Phi$_{Wt}$.

Measurement in respect of those values is effected in conventional fashion by extrapolation at zero concentration of the curves representing respectively the inverse of the apparent molecular mass AM and the inverse of the apparent hydrodynamic diameters in dependence on the concentration of the polymerized fraction of basic aluminum chlorosulfate in question. The correspondence between the real mean value and the apparent value of the molecular mass is in fact given by the Debye relationship as follows:

$$1/M_w = 1/AM + Bc$$

in which c represents the level of concentration of the solution of basic aluminum chlorosulfate and B represents a constant (coefficient of the virial).

In attempting to prepare the basic aluminum chlorosulfate in accordance with the previously referenced French Patent Publications, it was noted that extremely large amounts of by-product calcium sulfate are formed in the process, equipment expenditure is high, and the product stability is poor as concerns long term storage. If the user of the process disclosed in the French Patent Publications has no outlet for the calcium sulfate mud produced as a by-product, the cost of eliminating the by-product seriously affects the economics of the process. Similarly, equipment required for the many stages of the referenced process makes the process less desirable from a commercial standpoint. The problem of storage stability becomes of great importance if the product remains in storage more than a few months prior to use, as the product precipitates from its normally liquid state to form a non-usable solid. Further, raw materials of pure form having no metallic impurities must be used as the impurities affect the polymerization reaction.

It has now been found that basic aluminum chlorosulfates can be prepared by an improved process which reduces the quantity of by-product calcium sulfate mud, utilizes equipment and raw materials of lower cost, and which provides a more stable product.

SUMMARY OF THE PRESENT INVENTION

In accordance with the present invention, there is provided a new process for preparing basic aluminum chlorosulfates which comprises forming a reaction mixture of aluminum chloride in aqueous medium and aluminum sulfate to form an intermediate prereaction mixture, followed by reacting (basifying) that intermediate prereaction mixture with an OH forming compound, preferably a calcium compound, sufficient to change the basicity of the product to allow formation of the polymer product desired. By this process, basic aluminum chlorosulfate can be prepared with less by-product, less expensive raw materials, more economical equipment while providing a more stable product. The basic aluminum chlorosulfate as prepared in this invention is a described and limited in the discussion in connection with the referenced French Patent Publications.

DETAILED DESCRIPTION OF THE INVENTION

The aluminum trichloride which is utilized in the present invention can be obtained from any known source. It has been found that the present invention allows for the preparation of the basic aluminum chlorosulfate product without significant problems in the polymerization reaction which are known to be caused by metallic impurities such as iron or manganese as in the prior art process. Therefore, the aluminum trichloride can be prepared from ores or minerals such as kaolin clays or bauxite by known reactions such as the reaction of kaolin with hydrochloric acid.

The aluminum sulfate, $Al_2(SO_4)_3$ or alum used in the invention can be iron free or commercial grade containing iron impurities. The alum is preferably used as a solution, beneficially when the present process is conducted as an adjunct to an alum plant. If not, solid alum can be dissolved in water. Preferably, the alum solution has an alum content ranging from about 7.5% to about 8.5% and more preferably from about 7.9% to about 8.3%, the percentages being calculated as $Al_2O_3$.

The process for the preparation of the basic aluminum chlorosulfate according to the invention will now be more fully described.

In a first stage, $AlCl_3$ is blended with $Al_2(SO_4)_3$ in aqueous medium. The blending is generally conducted under agitation and slight warming. Temperatures within the range from about 35° C. to about 50° C. have been found to be advantageous.

It has also been found advantageous to utilize a mole ratio of $AlCl_3$ to $Al_2(SO_4)_3$ within the range of from about 0.75:1 to about 1.3:1, preferably from about 0.9:1 to about 1.25:1 and more preferably from about 1:1 to about 1.2:1. The best results have been achieved utilizing a mole ratio of about 1.1:1.

It has been noted that the acidity of the $AlCl_3$ can contribute to a solidifying reaction. It is therefore preferable to utilize reactants which are low in acidity. It has also been observed that prereaction mixtures having combined $AlCl_3$ and $Al_2(SO_4)_3$ amounts above about 8.5% $Al_2O_3$ tend to solidify and combined amounts below 8.5 are therefore preferred. If however it is desired to utilize reactants containing sufficient acidity to cause solidification or an amount of reactants above 8.5%, the solidification can be avoided by utilizing small amounts of water such as the use of ten additional percent by weight based on the weight of the $AlCl_3$. Heating can also be used to cause the solid to revert to solution.

The reaction mixture is agitated (non-shearing agitation) and maintained at a temperature typically ranging from about 35° C. to about 50° C. A higher temperature may initiate side reactions and a lower temperature may cause difficulties during subsequent filtration.

After the $AlCl_3$ has been combined with the $Al_2(SO_4)_3$, this prereaction mixture is then basified i.e., reacted with a hydroxyl forming compound such as calcium to form a polymer. The prereaction mixture can be slowly heated to temperature and allowed to remain there under agitation. In one particular embodiment of the invention, and upon reaching the temperature within the range of from about 35° to about 50° C., the product is basified. While the hydroxides, carbonates, and bicarbonates of alkali metals such as sodium and potassium can be used for basification, the preferred compounds are calcium compounds. The most preferred calcium compound for use in this portion of the process is $CaCO_3$ though other calcium compounds such as the oxide or the hydroxide and their mineral forms limestone, lime, and slaked lime can also be used. The $CaCO_3$ can be added as a powder or, preferably, as a slurry in water. The slurry is preferred inasmuch as the addition of the powder tends to cause lumpiness during the reaction and is not a clean way of effecting addition. Slurries in the range of from about 1:0.4 to about 1:1.5 $CaCO_3$ to water are preferred though more (1:2) or less water can be used. The amount of water used is dependent on the source and size of the calcium compound, the smaller particle sizes and the better grades requiring more water to prepare effective slurries. $CaCO_3$ is preferably added over time and the reaction is allowed sufficient time to basify, i.e., to provide a ratio of $m/3n \times 100$ within the range of from about 40% to about 65% and preferably from about 45% to about 60%. Basification times generally range from about four to about eight hours though this is dependent on the degree of basification desired. Basification temperatures generally range from about 35° to about 50° C.

The degree of basification of the final product is a function of the final relative basification of the product and selection is based on the final product desired. Higher $Al_2O_3$ content (strength) in combination with higher relative basicity up to about 60% have been found to contribute the polymer stability. Above 60% relative basicity, the product tends to solidify. $Al_2O_3$ strength above 9% is desired for best stability for relative basicity, preferably between 50 and 58%.

Upon the conclusion of the basification, and in one particular embodiment of the invention, an aging or maturization and cooling stage of the reaction medium is advantageously carried out.

In this case, the reaction mixture is allowed to cool from reaction temperature to a temperature that usually ranges from about 5° C. to about 30° C. and preferably 21° C.–27° C. During the aging, the mixture is maintained under non-shearing agitation and generally in a quiescent state. The aging period typically extends from about 30 minutes to about four hours. Longer times can be used though Applicants consider completion of the reaction within 24 hours to be important for product stability.

Inasmuch as the product is an inorganic polymer, it has the ability to crosslink upon aging. The crosslinking destroys the capability of the polymer to gel when added to water. In the past, material having a shelf life of about three months has been prepared. It has been found that residual quantities of calcium sulfate which remain in the product contribute to the instability of the product. Therefore, the process of the present invention optionally includes the further step of treating the final product to reduce the quantity of residual calcium sulfate to a minimum level. This can be accomplished by cooling and refrigerating the reaction mixture sufficiently to allow a more complete separation of the calcium sulfate. Holding the product at temperatures ranging from about 5° to about 20° C. and preferably from about 10° to about 20° C. for a period of time ranging from about one to about four hours or longer depending on batch size in addition to the maturization to increase the stability of the product. The completion of the reaction within a 24 hour period is also a consideration relative to cooling time.

It has also been found that the amount of total aluminum present in the product appears to contribute to an increase in stability. Amounts of total aluminum ranging from about 8.2% to about 9.5% and preferably above about 9% calculated as $Al_2O_3$ are recommended. Amounts of below 8% could be used if the product was destined for use without storage.

Following the reaction and optional aging and cooling stages, the reaction medium is separated. The separation may be carried out by any known means, in particular, by filtering, centrifugation, draining, or decantation. Preferably, filtration is used. It may also be advantageous to filter under pressure.

After filtration, a cake essentially consisting of calcium sulfate and a filtrate consisting of the desired end product containing the basic aluminum chlorosulfate is recovered.

The chlorosulfate product may be advantageously used for the treatment of an aqueous medium, such as, for example, drinking water, industrial feedwater, or waste waters.

In this case, the final product is added to the aqueous medium in variable proportions, as a function of the water to be treated.

In such application, the product of the invention makes it possible to realize a particularly low amount of residual aluminum in the medium treated. Furthermore, while it is generally necessary with the prior art materials to treat aqueous medium at pH values less than eight to provide an acceptable amount of residual aluminum, this is not necessary with the final product of the present invention.

While the reaction of the present invention is not endangered by the presence of minor amounts of minerals in the starting materials, the product, in certain cases, can have a color extending from a very deep brown to yellow, and, on the other hand, a turbidity greatly exceeding 100 NTU units.

This turbidity may well be due to a particularly high proportion of solids and suspensions, in particular, relative to gypsum and the humic substances. Coloration can be due to iron or humic substances. If desired, the final products can be treated with absorbents or flocculating polyelectrolytes, either nonionic or cationic illustrated in the first case by activated carbon, activated alumina, alumino-silicate, silica gels, magnesia, and clay. In the second case, the polyelectrolytes can be illustrated by polyacrylamides, polyethylene oxides, polyvinylpyrrolidones, and polyvinylalcohol.

In order to further illustrate the present invention and the advantages thereof, the following specific examples are given. It being understood that the same are intended only as illustrative and in no way limitative.

EXAMPLE 1

Preparation of 33 Tons of Product—Preferred Embodiment

In a 2000 gallon (7,571 liter) Kynar lined reactor equipped with an agitator and an external heat exchanger was prepared $AlCl_3$ from $Al(OH)_3$ and HCl in water. Fumes from the heated reaction were conducted to a 500 gallon (1.893 kiloliter) closed reactor having an agitator and being connected to another 500 gallon (1.893 kiloliter) reactor. The latter reactor is connected to a fume scrubber. The first reactor contains a slurry of $CaCO_3$ in water. The amount of $CaCO_3$ utilized is based on the amount of such slurry that is used later in the reaction. The amount will be discussed later.

Into a 16,000 gallon (60.57 kiloliter) batch reactor equipped with agitation means, steam inlet and an external heat exchanger was added 14,564.9 pounds (6606.5 kilos) or 1357 gallons (5.136 kiloliters) of a 28.82% solution of $AlCl_3$. At about the same time there was added 472.6 gallons (1751 liters) $H_2O$ with agitation. Commercial grade alum solution containing about 0.2% $Fe_2O_3$ in an amount of 4113 gallons (15.57 kiloliters) at 28.19% or 45,654.5 pounds (20.71 kilos) $Al_2(SO_4)_3$ was also added to the reactor. The reaction mixture was heated by means of steam to a temperature within the range of from about 104° to about 120° F. (about 40° to about 49° C.) When the reaction mixture reached the desired temperature, the $CaCO_3$ slurry from the HCl scrubber was metered into the reactor. Initially, the $CaCO_3$ slurry is composed of a sufficient quantity of $CaCO_3$ to effect basification of the prereaction product mixture. In the present Example, a 2:1 $CaCO_3$:$H_2O$ slurry was prepared by admixing 8580 pounds (38.92 kilos) $CaCO_3$ with 515 gallons (1.95 kiloliters) $H_2O$. The slurry was incrementally added and analysis was periodically conducted to determine basicity. The intended goal of the reaction was to provide a product having a relative basicity within the range of from about 52% to about 58%. The basification was continued until that goal was reached. If the $CaCO_3$ was insufficient because some was used in neutralizing any acid present in the reaction mixture or too much was used in scrubbing the HCl or too much was needed for basification, addition slurry can be made and added.

At the conclusion of the basification reaction, the reaction mixture temperature was within the range of 40° to 49° C. The reaction mixture was allowed to cool to room temperature. This period of time during the cooling allows the product to mature. The time can vary from two to six hours depending on the size of the reaction mass. In the present Example, the maturing took place over about six hours.

Following maturization, the product was separated by pressure filtration. The resulting product had a basicity of 4.67%, a $Al_2O_3$ content of 8.64% and a relative basicity of 54.1%.

It is noted that it has been observed that difficulties in separation of by-product gypsum can occur if the reaction goes too long. Applicants attempt to complete the reaction sans filtration within 24 hours.

It has been noted that excess gypsum in the product results in the product setting up in the storage or transportation vessels. Steps are therefore taken to keep the amount of by-product gypsum in the product as low as possible. In addition to the reaction time, any normal means which can be used to increase precipitation of the gypsum can be used. Chilling or refrigeration can be used to further reduce by-product content. Temperatures within the range of from about 5° to about 20° and preferably from about 5° to about 15° C. can be used.

EXAMPLE 2

In a 2,000 gallon (7,571 liter) Kynar polyvinylidene fluoride lined reactor equipped with an agitator, a steam probe made of Kynar, and an external one foot (30.48 centimeters) by 15 foot (4.57 meters) FRP scrubber with a 15% lime solution and a five gallon/minute (19 liter/minute) flow rate to control HCl fumes and containing 1,056 gallons (3,397 liters) of 22° Baume HCl [lime solution to control HCl fumes] was incrementally added 2,800 pounds (1,270 kilos) of aluminum trihydrate with agitation. Steam injection was started to begin the reaction.

After three hours, the reactor temperature reached 300° F. (149° C.). At this temperature, the reaction was more exothermic than believed, generating excessive HCl fumes which exceeded the capacity of the scrubber. The steam injection was halted and the reaction allowed to continue until it stopped. On the following day, the $AlCl_3$ reaction mixture was analyzed and found to contain 24.46% $AlCl_3$ (target 27.82%) with 1.6% free acid.

Into another batch reactor equipped with two paddle agitators, a temperature indicator, a disk-flo pump, and recirculating line were added 3,166 gallons (11.98 kiloliters) of iron-free alum liquor containing 26.98 % aluminum sulfate. 1,208 gallons (4.57 kiloliters) of $AlCl_3$ solution containing 24.46% $AlCl_3$ was added. After the addition, the reaction mixture initially solidified due to the acid content, but went back into solution upon heating by steam [attempting to achieve a temperature of 105°–120° F. (40.5°–49° C.)]. The resulting preproduct mixture was 8.38% $Al_2O_3$.

The resulting mixture was then basified. 3,864 pounds (1,753 kilos) of $CaCO_3$ in a 1:1 by weight slurry was added to the preproduct mixture. The basicity of the product was 2.02% (free $Al_2O_3$). Additional $CaCO_3$ in slurry form was added according to the following schedule:

| Time After Previous Addition in Minutes | Amount of CaCO₃ Pounds | Kilos | Basicity |
|---|---|---|---|
| 60 | 460 | 209 | 2.65% |
| 40 | 368 | 167 | 2.90% |
| 30 | 184 | 83.5 | 2.90% |
| 20 | 736 | 334 | 3.51% |
| 45 | 230 | 104 | 3.48% |
| 75 | 552 | 250.5 | 3.76% |
| 150 | 230 | 104 | 3.93% |
| 45 | 230 | 104 | 4.07% |
| 45 | 368 | 107 | 4.30% |
| 30 | 368 | 167 | 4.32% |
| 30 | Basification complete/agitation shutdown. | | |

Total $CaCO_3$ added 7,590 pounds (3,443 kilos).
Calculated $CaCO_3$ requirement 6,240 pounds (2,830 kilos).

600 pounds (272 kilos) was required to neutralize free acid in $AlCl_3$ and line losses accounted for 400 pounds (181 kilos).

Final product analysis:

| | |
|---|---|
| $Al_2O_3$ | 8.86% |
| Basicity | 4.61% |
| Ca | 1,652 ppm |
| Cl | 5.48% |
| SO₄ | 5.75% |
| Relative Basicity | 52.00% |

EXAMPLE 3

Using a 1.283:1 Mole Ratio $AlCl_3:Al_2(SO_4)_3$

In a two liter beaker equipped with a magnetic stirring bar, an external heat source, and a thermometer was charged 240 grams $AlCl_3$ (neutral) as a 28% solution (as an 11% $Al_2O_3$ solution) prepared by reacting a commercially available aluminum trihydrate with hydrochloric acid and 480 grams $Al_2(SO_4)_3$ which was then heated to a temperature ranging from 40°–49° C. As soon as the reaction mixture reached the temperature range, the mixture was basified at 40° C. by incrementally adding 84.5 grams of solid $CaCO_3$. Lumps of unreacted $CaCO_3$ appeared in the mixture. The mixture was stirred slowly and the release of small gas bubbles was observed. The basification stage continued for about six hours at 40°–45° C. The mixture was allowed to stand quiescently and mature for about six hours. The temperature was allowed to decrease during maturization and at the end of maturization, the temperature was about 20° C. After maturation, the reaction mixture was allowed to cool slowly overnight.

After isolating the by-product $CaSO_4$ by filtration, the filtrate was tested for effectiveness in a water gel test that was performed by mixing nine parts water to one part product. A cloudy product was achieved within five to seven minutes and the solution gelled overnight. The basicity of the product was 4.31 and the percent $Al_2O_3$ was 9.18. The ratio of free $Al_2O_3/Al_2O_3$ equals 52.68%.

EXAMPLE 4

Use of 0.75:1 Mole $AlCl_3:Al_2(SO_4)_3$

The procedure of Example 3 was repeated using 40 grams $Al_3$, 136.9 grams $Al_2(SO_4)_3$ and 20.75 grams of $CaCO_3$. The $CaCO_3$ went into solution easier than using a 1:1 or a 1.283:1 ratio. Basification was continued for about four hours and maturation was continued for about three and three quarter hours. The water test provided a cloudy admixture which gelled within 10 minutes. The gel was milky colored and less solid than using a higher mole ratio. The basicity was 4.73% and the content of $Al_2O_3$ was 9.12% providing a relative basicity of 51.86%.

EXAMPLE 5

Using 1:1 Mole Ratio $AlCl_3:Al_2(SO_4)_3$

The procedure of Example 3 was repeated using 60 grams of $AlCl_3$, 153.96 grams $Al_2(SO_4)_3$ and 25.12 grams $CaCO_3$. The basification stage lasted for about four hours and the maturation stage lasted for three and three quarter hours. In the water test, a cloudy solution was formed within three minutes and the material gelled completely by the next day. The basicity of the material is 4.76% and the $Al_2O_3$ content is 9.33 and the relative basicity is 51%.

EXAMPLE 6

Use of 1:1 Mole Ratio $AlCl_3:Al_2(SO_4)_3$ and $CaCO_3$ Slurry

The procedure of Example 3 was repeated using 100 grams $AlCl_3$, 256.6 grams of $Al_2(SO_4)_3$ and 46.4 grams of $CaCO_3$. The $CaCO_3$ was mixed with 75 milliliters of water to form a slurry. The slurry of $CaCO_3$ was added at a slow rate, though the rate was too fast and the solution bubbled over. The solution turned gray after the $CaCO_3$ slurry was completely added. Some $CaCO_3$ was left in its beaker. Basification was continued for two hours and ten minutes and maturation was allowed to continue for approximately three hours. The solution was allowed to cool naturally.

A cloudy solution was obtained as soon as the ingredients were mixed together in the water test. A solid gel was obtained after standing overnight. The basicity or free aluminum oxide was 4.01% and the amount of free aluminum oxide was 7.63% providing a relative basicity of 52.5%.

EXAMPLE 7

Use of 1:1 Mole Ratio $AlCl_3:Al_2(SO_4)_3$

The procedure of Example 3 was repeated using 50 grams $AlCl_3$, 128.3 grams $Al_2(SO_4)_3$, and 23.2 grams $CaCO_3$ in a 1:0.5 slurry in water. The $CaCO_3$ was added with a stirrer running moderately fast. $CaCO_3$ addition was improved—fewer lumps of unreacted $CaCO_3$. Basification was allowed to continue for six hours as was maturation. The product was allowed to cool down naturally overnight. The aluminum oxide content was 8.92%.

EXAMPLE 8

Use of 1.1:1 Mole Ratio $AlCl_3:Al_2(SO_4)_3$

The reaction of Example 7 was conducted using the above stated mole ratio. Fifty grams of $AlCl_3$, 116.6 grams of $Al_2(SO_4)_3$ and 21.67 grams of $CaCO_3$ were utilized. The $Al_2O_3$ content of the product was 9.14%.

EXAMPLE 9

Use of a 1.2:1 Mole Ratio $AlCl_3:Al_2(SO_4)_3$

Using the reaction of Example 7, 50 grams of $AlCl_3$, 106.9 grams of $Al_2(SO_4)_3$, and 20.41 grams of $CaCO_3$ were utilized. The $Al_2O_3$ content was 9.03%.

EXAMPLE 10

Using a 1.1:1 Mole Ratio $AlCl_3:Al_2(SO_4)_3$

Following the reaction procedure Example 7, 220 grams $AlCl_3$, 523.2 grams $Al_2(SO_4)_3$, and 92.0 grams $CaCO_3$ were reacted. The $CaCO_3$ was added as a solid using high speed mixing. Smaller lumps were observed. Basification and maturation were conducted for six hours. The product yielded 71.6% of basic aluminum chlorosulfate having a basicity or free $Al_2O_3$ content of 4.97% and a $Al_2O_3$ content of 9.34% which provides a relative basicity of 53%.

EXAMPLE 11

Various reactions were conducted according to the procedure of Example 7 utilizing a 1.1:1 mole ratio of $AlCl_3$ to $Al_2(SO_4)_3$. Because of the acidity of the aluminum chloride, the various samples set up within a few minutes of addition. The addition of small quantities of water in the range of 10% and more additive percentage based on the weight of the $AlCl_3$ avoided the solidification problem as would the use of an $AlCl_3$ of low acidity.

The reaction procedure of Example 7 was repeated utilizing a 1.1:1 mole ratio of $AlCl_3:Al_2(SO_4)_3$. The $AlCl_3$ was prepared so as to contain 98 ppm ferric oxide. In this reaction, 105.5 grams of $AlCl_3$ was reacted with 282.8 grams $Al_2(SO_4)_3$ and 11.7 grams water. Basification was conducted using 55.2 grams of $CaCO_3$ in 27.6 grams water. The $CaCO_3$ was added within 50 minutes; basification and maturation taking three hours each. The basicity or free $Al_2O_3$ is 4.59 and the $Al_2O_3$ content is 8.25 leading to a relative basicity of 55.6.

The preceding reaction was conducted in the same manner with the exception of the $CaCO_3$ slurry was added in one hour and thirty minutes with no heat, stirred for six hours and allowed to settle overnight. The basicity wa 4.83 and the aluminum oxide content was 8.03 leading to a relative basicity of 60%.

EXAMPLE 12

It has also been found that the amount of total aluminum present in the product appears to contribute to an increase in stability. As can be seen from the following table, samples containing higher amounts of aluminum were stable longer. Amounts of total aluminum above about 9% calculated as $Al_2O_3$ are recommended.

TABLE 1

| Sample | Total $Al_2O_3$ - % | Basicity % | Relative Basicity % |
|---|---|---|---|
| 1 | 7.99 | 4.46 | 55.8 |
| 2 | 8.34 | 4.62 | 55.4 |
| 3 | 8.50 | 4.66 | 54.8 |
| 4 | 9.02 | 4.98 | 55.2 |
| Control | 9.26 | 5.10 | 55.1 |

TABLE 2

| Sample | Stability Month | | | |
|---|---|---|---|---|
|  | 1 | 2 | 3 | 4 |
| 1 | Milky Tint | Thickened | Very Thick | Gelled Solid |
| 2 | — | Viscous | Milky Tint | Thickened |
| 3 | — | — | — | Milky Tint |
| 4 | — | — | — | — |
| Control | — | — | — | * |

*White calcium crystals on bottom

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for preparing basic aluminum chlorosulfate comprising:
   1) reacting in aqueous medium aluminum chloride and aluminum sulfate in a molar ratio of aluminum chloride:aluminum sulfate ranging from about 0.75:1 ; to about 1.3:1 followed by
   2) basifying the product of step 1) with an agent which will form OH groups with the water in an amount sufficient and under conditions sufficient to form a polymer.

2. The process according to claim 1 which includes the further step of forming the aluminum chloride by reacting aluminum trihydrate with hydrochloric acid.

3. The process as recited in claim 2 wherein the aluminum trihydrate is prepared from a source selected from the group consisting of bauxite and kaolin.

4. The process as recited in claim 1 wherein said basic aluminum chlorosulfate comprises a substance of the following formula:

$$Al_nOH_m(SO_4)_kCl_{3n-m-2k}$$

wherein the basicity or the ratio $m/3n \times 100$ ranges from about 40% to about 65%, the ratio of Al equivalent/Cl equivalent ranges from about 2.8 to about 5, the apparent molecular mass AM measured by conventional light diffusion ranges from about 7,000 to about 35,000 daltons, said basic aluminum chlorosulfate having an apparent hydrodynamic diameter $Phi_Z$ and $Phi_W$ as measured by quasi-elastic diffusion of light, of the following values:

$$Phi_Z (nm) = 35-250 \ (350-2500 \ \text{Å})$$

$$Phi_W (nm) = 20-120 \ (200-1200 \ \text{Å}).$$

5. The process as recited in claim 4 wherein said basic aluminum chlorosulfate has an apparent molecular mass and apparent hydrodynamic diameters of the following values:

$$AM = 22000-32000$$

$$Phi_Z (nm) = 150-220 \ (1500-2200 \ \text{Å})$$

$$Phi_W (nm) = 80-110 \ (800-1100 \ \text{Å})$$

6. The process as recited in claim 4 wherein said basic aluminum chlorosulfate further has a mean molecular mass by weight $Mw$ and mean real hydrodynamic diameters $Phi_{ZT}$ and $Phi_{WT}$ of the following values:

$$Mw = 10000-300000$$

$$Phi_{ZT} (nm) = 9-45 \ (90-450 \ \text{Å})$$

$$Phi_{WT} (nm) = 5-30 \ (50-300 \ \text{Å})$$

7. The process as recited in claim 6 wherein said basic aluminum chlorosulfate has a mean molecular mass by weight and means real hydrodynamic diameters of the following values:

$$Mw = 19000-30000$$

$$Phi_{ZT} (nm) = 10-15 \ (100-150 \ \text{Å})$$

$$Phi_{WT} (nm) = 6-8 \ (60-80 \ \text{Å})$$

8. The process as recited in claim 4 wherein the amounts of aluminum trichloride and aluminum sulfate are such that, for the basic aluminum chlorosulfate produced, there is a ratio $m/3n \times 100$ of between 40% and 65% and an Al equivalent/Cl equivalent ratio of between 2.8 and 5.

9. The process according to claim 4 wherein the basic aluminum chlorosulfate produced has a basicity of between 45 and 56%.

10. The process according to claim 4 wherein the basic aluminum chlorosulfate produced has an Al equivalent/Cl equivalent ratio of between 3.2 and 5.

11. The process according to claim 10 wherein the basic aluminum chlorosulfate produced has an Al equivalent/Cl equivalent ratio of between 3.2 and 4.

12. The process according to claim 1 wherein the reaction mixture is basified to remove sulfate in a ratio of the amount of sulfate eliminated to that present in the initial aluminum sulfate ranging from about 70% to about 90%.

13. The process according to claim 12 wherein the desulfation ranges from about 70% to about 85%.

14. The process according to claim 12 wherein the desulfation ranges from about 75% to about 82%.

15. A process according to claim 1 including the further step of maturing the reaction mixture containing the aluminum chlorosulfate of the desired basicity prior to separation of the basic aluminum chlorosulfate.

16. A process according to claim 15 wherein said reaction mixture is matured by cooling to a temperature ranging from about 5° C. and about 30° C.

17. A process as recited in claim 16 wherein the reaction mixture is cooled to a temperature ranging from about 21° to about 27° C.

18. A process as recited in claim 16 wherein the reaction mixture is maintained at a temperature of between 21° C. and 27° C. for a period of between 30 minutes and four hour after the maturing operation.

19. The process of claim 15 which further includes the step of cooling the product after maturization to a temperature ranging from about 10° C. to about 20° C.

* * * * *